May 2, 1967     W. J. DUMMLER     3,317,045
FILTER UNIT WITH RADIALLY COMPRESSED ELEMENT
Filed Sept. 23, 1963     2 Sheets-Sheet 1
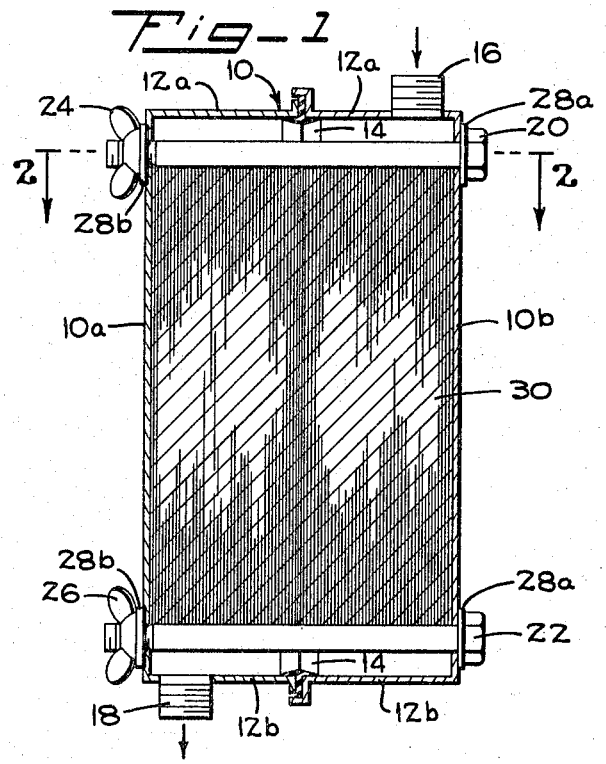
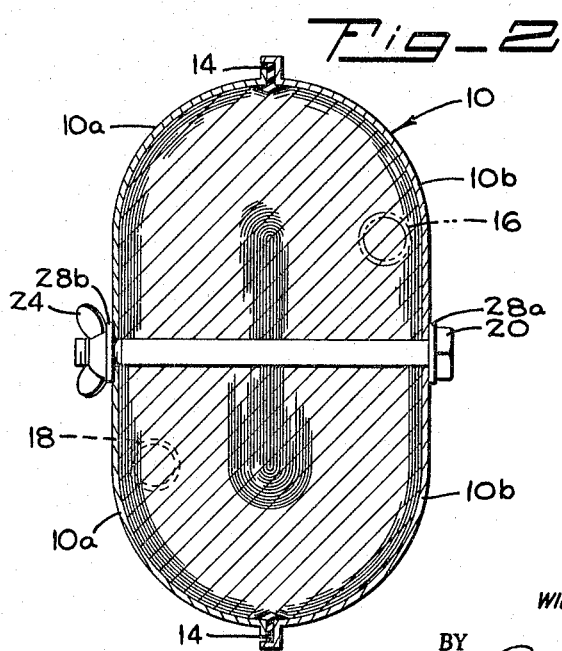
INVENTOR.
WILLIAM J. DUMMLER
BY Paul B. Fihe
PATENT AGENT May 2, 1967 W. J. DUMMLER 3,317,045
FILTER UNIT WITH RADIALLY COMPRESSED ELEMENT
Filed Sept. 23, 1963 2 Sheets-Sheet 2
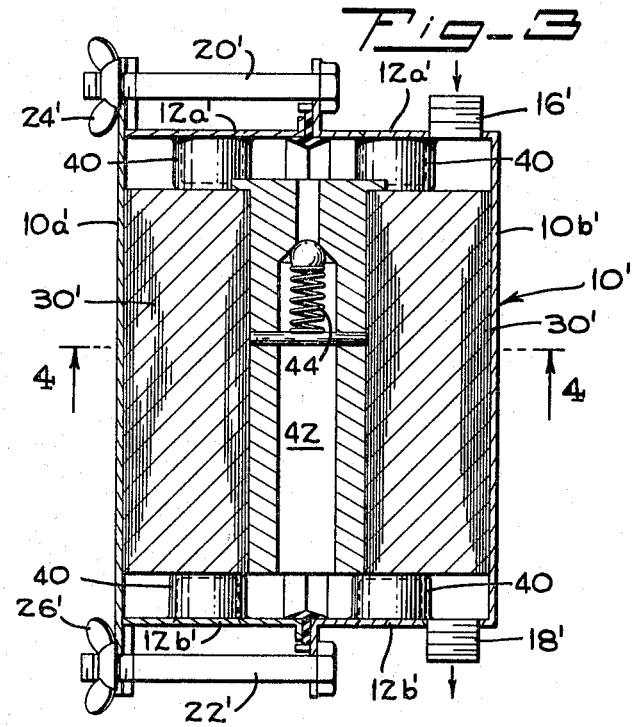
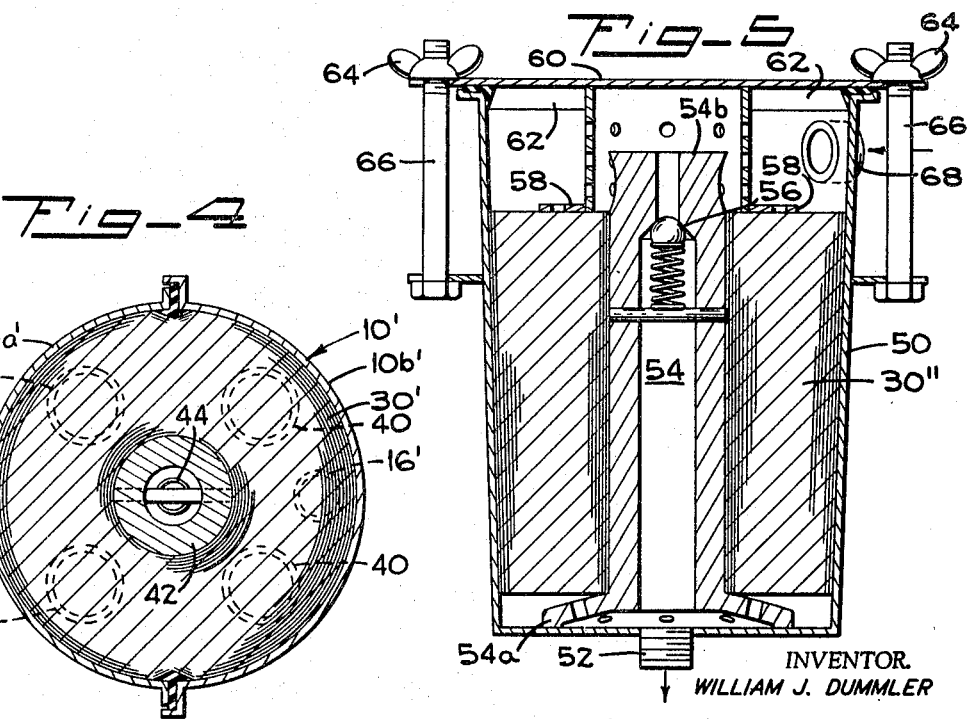
INVENTOR.
WILLIAM J. DUMMLER
BY Paul B. Fihe
PATENT AGENT

United States Patent Office 3,317,045
Patented May 2, 1967

3,317,045
FILTER UNIT WITH RADIALLY COMPRESSED ELEMENT
William J. Dummler, San Jose, Calif., assignor to Motor Guard Corporation, San Jose, Calif., a corporation of California
Filed Sept. 23, 1963, Ser. No. 310,754
7 Claims. (Cl. 210—130)

The present invention relates generally to filtration and more particularly to a filter unit arranged for continuous filtration of oil as may be circulated in an internal combustion engine lubricating system.

In normal operation, it is well known that lubricating oils for internal combustion engines become "dirty," which signifies that water, carbon, sulfur, and other impurities have accumulated to reduce the lubricating qualities of the oil. To remove such impurities, it is established practice to utilize filters, and, in view of the fact that it is impractical to cleanse the existent filters, as, for example, by reverse flushing which is commonly done in commercial filtration processes, the filter units normally contain a replaceable cartridge. Such cartridges have for the most part been relatively expensive and it is normally recommended that these replaceable filter cartridges be changed almost as frequently as the engine oil itself. Consequently, the considerable expense is only justified in relation to the greater expense which would be involved in more frequent engine repair if the oil were not continuously filtered or changed.

In an effort to reduce the cost of the replacement cartridge, recent filter units utilizing a roll of absorbent paper of a type corresponding to ordinary "toilet tissue" have been introduced; the paper acts as the filtering medium and has proven for the most part to have excellent characteristics for this purpose. However, several deficiencies have been noted; in the first place, there has been some difficulty both in the appropriate insertion and subsequent removal of the roll of paper, and secondly, when the roll is not precisely inserted, channels are formed enabling some or all of the oil to actually by-pass the paper filtering medium itself wherefore its utility is seriously reduced.

Accordingly, it is an object of the present invention to provide an oil filter unit including a roll of paper tissue or other compressible filtering material arranged to facilitate insertion and withdrawal of such actual filter element itself, yet when positioned within the unit, such filter element is disposed to assure effective filtering and the consequent elimination of oil by-pass therearound.

More particularly, it is a feature of the invention to provide a filter unit that can utilize a toilet tissue roll having a central or axial opening, as conventionally purchased in any market whereby availability of the replacement filter element is assured.

Additionally, in accordance with one aspect of the invention, the filter unit provides a core element arranged for easy insertion within the central axial opening of a toilet tissue roll but subsequently enables lateral or radial compression of the roll to thus provide an effective filtering mechanism.

It is another feature of the invention to provide a core unit, as mentioned, which is arranged to facilitate insertion and removal of the tissue roll.

Yet more specifically, and in accordance with another specific aspect of the present invention, such core unit constitutes a tube arranged to provide oil by-pass of the filter element when a temporary blockage of oil flow through the filter element exists.

In accordance with another significant aspect of the invention, a filter unit is provided which laterally or radially compresses a roll of toilet tissue or the like so that the existent central opening therein is eliminated by such pressure to provide a homogeneous, non-channeling filter element.

These as well as other objects and features of the invention will be more apparent from a perusal of the following description of the structures illustrated in the accompanying drawings wherein:

FIG. 1 is a side elevational view of a filter unit constituting one embodiment of the invention, portions thereof being broken away to illustrate interior details thereof, FIG. 2 is a transverse sectional view taken along line 2—2 of FIG. 1, FIG. 3 is a longitudinal, central, sectional view through a slightly modified structure incorporating certain additional features of the present invention, FIG. 4 is a transverse sectional view taken along line 4—4 of FIG. 3 and FIG. 5 is a longitudinal sectional view through another structure constituting a third embodiment of the invention.

With initial reference to FIGS. 1 and 2, the oil filter unit constituting one embodiment of the present invention includes a housing 10 generally of cylindrical and, more specifically, of elliptical or oval cross-section, as best shown in FIG. 2, and composed of two similar sections 10a, 10b, each of generally semi-cylindrical configuration with semi-circular plates 12a, 12b at their extremities and registering lip portions arranged to sealingly engage a gasket 14 to thus form a sealed enclosure. At one end of the housing 10, a suitable fitting 16 is secured to enable threaded attachment of an oil inlet pipe and at the remote end of the housing 10 a similar fitting 18 is provided to enable connection to an oil outlet pipe. Two bolts 20, 22 extend through aligned openings in the two housing sections 10a, 10b adjacent the ends thereof for the reception of thumb nuts 24, 26 which, when tightened secure the lip portions of the housing section 10a, 10b in sealing relationship with the described gasket 14. To seal the aligned openings, small rubber washers 28a, 28b are provided adjacent the heads of the bolts 20, 22 and the described thumb nuts 24, 26. As best shown in FIG. 2, the bolts 20, 22 extend in a direction perpendicular to the plane defined by the gasket 14.

A filter element 30 which, as illustrated, consists of a roll of paper toilet tissue is positioned within the housing 10 with its axis aligned with the housing axis wherefore it will be obvious that the plane of the rolled paper will be parallel to the flow of oil therethrough from the described inlet fitting 16 to the outlet fitting 18. The bolts 20, 22 themselves can serve to restrain the roll of paper from moving into abutting relationship with the ends of the housing 10 so that a chamber is formed at each end of the housing to allow exposure of the entire end of the filter element 30 to the flowing oil.

The filter element 30, before insertion into the housing 10, can be a conventional roll of toilet tissue with a central or axial opening. The roll of tissue is merely seated in the lower housing section 10b and the upper section 10a is then placed thereover and the nuts 24, 26 tightened to clamp the housing sections together and apply pressure to the roll of tissue. The radial or lateral compression thus applied to the roll of tissue serves to fully close the previously existent central opening and at the same time urge the roll laterally outward in a direction perpendicular to the bolts 24, 26 so as to entirely fill the housing 10 as illustrated. Obviously, the dimensions of the housing 10 are chosen to correspond generally to the normal dimensions of a roll of toilet tissue, but any slight deviation will be accommodated by the application of the radial or lateral pressure on the roll. Thus, one can be assured that the roll of toilet tissue is sufficiently compressed to avoid the existence of any channels in an axial direction therethrough.

As is well known, a single roll of toilet tissue will absorb a considerable amount of water and will also serve to effectively filter carbon or other impurities from the oil passing therethrough. After a roll of tissue has been used for a period of time depending upon the characteristics of the oil and the particular internal combustion engine with which the filter unit is utilized, it will become saturated with water or partially blocked by accumulation of solid impurities. At this time, the roll of tissue is easily replaced by the simple removal of the two thumb nuts 24, 26, the subsequent separation of the two housing sections 10a, 10b, and the simple lifting of the roll from its disposition, whereupon a new roll can be placed in the lower housing section 10b and quickly enclosed by reapplication of the upper housing section 10a and the nuts 24, 26 in the manner previously indicated.

It is to be expressly noted that while a roll of toilet tissue is preferred for use in the described structure, other compressible filtering mediums can be employed with similar facility of insertion and subsequent withdrawal from the housing wherefore the advantages of the unit with such alternative filtering elements are retained substantially to an equal extent.

Since the described roll of toilet tissue absorbs water, it will be apparent that in colder climates, such water may undergo a change of state. The ice so formed within the filtering unit can then conceivably block the flow of oil through the filtering element 30.

This problem is effectively and automatically avoided by a slightly modified embodiment of the invention as illustrated in FIGS. 3 and 4 wherein parts corresponding to those illustrated in FIGS. 1 and 2 are given like numerical designations with the simple addition of a prime notation.

The housing sections 10a', 10b', are semi-cylindrical and generally similar to those described in connection with the first embodiment of the invention, including suitable inlet and outlet oil fittings 16', 18' and provided with endwise extensions so that the securing and roll compressing nuts 24', 26' and bolts 20', 22' are positioned entirely exteriorly of the enclosing housing 10'. The end plates 12a', 12b' of the housing are provided with integral indentations 40 to maintain spacing of the roll of toilet tissue 30' inwardly from the housing ends. Within the central axial opening of the toilet tissue 30', a metal tube 42 is positioned to form a central passage through which oil may flow from the inlet to the outlet fittings 16', 18' when sufficient pressure is obtained to open a conventional check valve 44 including a ball urged into seated position by a spring whose remote end engages a small transversely extending fixed pin. Accordingly, if ice has been formed within the roll of tissue 30' sufficient to block the flow of oil therethrough, the check valve 44 may open to permit the oil to by-pass the filter element 30' and continue to the outlet thus providing recirculation of oil through the filter housing. Since the engine oil is quickly heated, such heat is transmitted from the central metal tube 42 into the surrounding paper to gradually melt the ice and permit once again the flow of oil through the filter element 30' when the pressure of oil has been reduced sufficiently to allow the spring to reseat the ball and thus close the by-pass.

Another embodiment of the present invention is shown in FIG. 5, such modified embodiment exemplifying the availability of structural deviations without loss of many of the advantages of the embodiments discussed hereinabove. As shown, such modified structure includes a generally cylindrical cup or container 50 having inwardly tapering side walls and a bottom which is closed except for a central outlet fitting 52 for passage of oil therefrom. A tube 54 having a check valve 56 therein in a manner generally similar to that described in connection with the embodiment of the invention shown in FIGS. 3 and 4 is centrally mounted in said cup-shaped container, the tube 54 having a laterally and downwardly extending base portion 54a which is apertured and rests at its lower extremity on the container bottom and a handle portion 54b above a roll of toilet tissue 30" that surrounds the tube 54 and is compressed between the tube and the tapered side walls of the container 50 by application of axial force on the top of the roll by an apertured flange 58 which can be integrally secured to the under-surface of a top plate or lid 60 arranged to sealingly engage a gasket 62 at the upper lip of the container 50. Nuts 64 and bolts 66 are arranged to secure the lid 60 in position, as shown, and an inlet fitting 68 for the oil can be mounted between the top of the roll of tissue 30" and the container lid 60 in the side wall enabling suitable connection of an oil inlet conduit. As mentioned, the handle portion 54b projects above the roll of tissue 30" enabling the tube 54 to be manually grasped after the container lid 60 has been loosened wherefore easy withdrawal of a used filter element is assured. Similarly, when the tube 54 and a new roll of paper 30" is placed within the container 50, tightening of the lid 60 thereon not only provides for sealing of the container 50, but also presses the roll of tissue downwardly against the tapered side walls of the cup-shaped container 50 to in turn effect a lateral compression thereof so that effective filtration is obtained, as explained in more detail in connection with the previous embodiments of the invention.

It will be apparent that yet other modifications and/or alterations can be made in the described structures without departing from the spirit of the invention, and the foregoing description of several embodiments can be considered only as exemplary and not in a limiting sense, and the actual scope of the invention is to be indicated only by reference to the appended claims.

What is claimed is:

1. A filter unit which comprises a housing composed of separate sections arranged for sealing juncture, a compressible roll of tissue filter element in said housing, said housing being arranged so that the separation of said separate sections exposes a wall of said filter element extending in the general direction of the endwise longitudinal axis of said housing, an inlet to said housing adjacent the upstream portion of said filter element, an outlet to said housing adjacent the downstream portion of said filter element, and means interconnecting said separate sections of said housing and adapted to urge said separate sections into sealing juncture for effecting compression, whereby said filter element is compressed in a direction substantially perpendicular to the endwise longitudinal axis of said housing and substantially entirely fills the radial cross-section of said housing.

2. A filter unit according to claim 1 wherein said filter compression means constitutes means extending in a direction perpendicular to a plane passing through the sealing juncture for simultaneously securing said housing sections in sealing relationship.

3. A filter unit according to claim 2 which comprises a tube extending through an axial opening in said roll of tissue, and a check valve disposed within said tube.

4. A filter unit which comprises a housing having an inlet and an outlet, said housing being formed by two generally semi-cylindrical sections arranged for sealing relation at their abutting lip portions, means releasably holding said sections in sealing relationship, and a compressible roll of tissue filter element encompassed by said sections and compressed by said housing sections when the latter are held in sealing relationship, whereby said filter element is radially compressed in a direction substantially perpendicular to the endwise longitudinal axis of said housing and substantially entirely fills the radial cross-section of said housing, said inlet and outlet of said housing being adjacent said filter element.

5. A filter unit according to claim 4 wherein said holding means includes at least one bolt extending substantially perpendicularly to the plane defined by the abutting lip portions of said sections.

6. A filter unit according to claim 4 wherein said holding means includes bolts extending through said housing sections adjacent the inlet and outlet ends thereof.

7. A filter unit according to claim 4 wherein each of said housing sections is flattened to form, when joined, an elliptical cross-section.

References Cited by the Examiner

UNITED STATES PATENTS

| | | | |
|---|---|---|---|
| 1,753,809 | 4/1930 | Short | 210—494 X |
| 2,086,739 | 7/1937 | Reed. | |
| 2,106,218 | 1/1938 | Krieck | 210—130 |
| 2,209,180 | 7/1940 | Von Pentz | 210—494 X |
| 2,661,846 | 12/1953 | Lash et al. | 210—494 X |
| 2,750,048 | 6/1956 | Hilbish | 210—494 X |
| 2,777,759 | 1/1957 | Sokolik. | |
| 2,928,547 | 3/1960 | Lawrence | 210—494 X |
| 2,995,254 | 8/1961 | Bennett | 210—494 X |
| 3,112,262 | 11/1963 | Parkinson | 210—494 X |
| 3,215,507 | 11/1965 | Horstmann et al. | |

REUBEN FRIEDMAN, *Primary Examiner.*

F. W. MEDLEY, *Assistant Examiner.*